United States Patent [19]

Brennan et al.

[11] Patent Number: 5,329,578
[45] Date of Patent: Jul. 12, 1994

[54] PERSONAL COMMUNICATION SERVICE WITH MOBILITY MANAGER

[75] Inventors: Paul M. Brennan, Toronto; Raymond M. Mark, Mississauga, both of Canada

[73] Assignee: Northern Telecom Limited, Montreal, Canada

[21] Appl. No.: 887,758

[22] Filed: May 26, 1992

[51] Int. Cl.⁵ .......................... H04M 1/64; H04M 3/42
[52] U.S. Cl. .......................................... 379/67; 379/88; 379/89; 379/97; 379/196; 379/201; 379/211
[58] Field of Search ............... 379/67, 88, 89, 196, 379/97, 201, 207, 210, 211, 212, 213, 214, 217, 374

[56] References Cited

U.S. PATENT DOCUMENTS

| 4,313,035 | 1/1982 | Jordan et al. | 379/230 |
| 4,850,012 | 7/1989 | Metita et al. | 379/217 |
| 4,893,335 | 1/1990 | Fuller et al. | 379/200 |
| 4,942,598 | 7/1990 | Davis | 379/67 |
| 5,023,868 | 6/1991 | Davidson et al. | 379/211 |
| 5,222,125 | 6/1993 | Creswell et al. | 379/88 |
| 5,239,577 | 8/1993 | Bates et al. | 379/201 |

OTHER PUBLICATIONS

PCT Publication #WO 91/07838-Published May 30, 1991.

Primary Examiner—James L. Dwyer
Assistant Examiner—Fan Tsang
Attorney, Agent, or Firm—Jean-Pierre Fortin

[57] ABSTRACT

A system for providing personal communication services (PCS) is described, wherein a subscriber can tailor the telephone service to provide communication mobility and incoming call management. Calls to a personal number assigned to the subscriber are routed to a PCS service node which will re-route the call according to the subscriber's service profile stored in a database. The service node insures that attempts to communicate with the subscriber are handled with appropriate consideration for who is calling, when the call is made, and the urgency of the call. In addition, the subscriber is given control over how the system will work for them in routing incoming calls.

11 Claims, 17 Drawing Sheets

PERSONAL COMMUNICATION SERVICE WITH MOBILITY MANAGER

FIELD OF THE INVENTION

This invention relates to personal communication services (PCS), but more particularly, to systems for providing a mobility/management service wherein the subscriber can tailor the telephone service to provide communication mobility and incoming call management.

BACKGROUND OF THE INVENTION

Increasingly, there is a demand for telephone services that provide easier access to a called party. For example, a new type of service is being introduced in which subscribers are provided with a single, personal telephone number used to access those subscribers regardless of their physical location. For example, callers to a personal number may automatically be connected to a business, residence, cellular or other phone, or voice messaging system, depending on where the individual they are trying to reach happens to be at the time of the call. The problem with some existing systems is that they are usually adapted to be connected externally of the telephone exchange and are therefore ill-adapted to provide efficient use of network wide features. For example, these systems cannot make use of Calling Line Identification (CLID) network features for the routing or treatment of incoming calls.

Accordingly, there is a need for a personal communication system which can be easily integrated with a network and able to offer incoming call management and communication mobility while making use of network based features.

SUMMARY OF THE INVENTION

In the personal communication service (PCS) of the present invention, calls to a personal number are routed to a PCS service node, which manages the communications services for all subscribers. The portion of the system providing PCS to an individual subscriber is hereinafter referred to as Personal Agent (PA). The Personal Agent ensures that attempts to communicate with an individual are handled with appropriate consideration for who is calling, when the call is made, and the urgency of the call. In addition, the PCS provides the subscriber personal control over the way in which the resulting system will work for them.

In accordance with one feature of the present invention, the personal communication system supports subscribers by providing communication mobility and incoming call management.

In accordance with another feature of the present invention, mobility support is provided by "Hunting", that is, attempting to contact the subscriber at a sequence of likely locations until the subscriber is reached.

In accordance with another feature of the present invention, mobility support is provided by allowing subscribers to store the ringing time allowed at each location or device when the system is attempting to reach the subscriber.

In accordance with another feature of the present invention, mobility support is provided by "Subscriber Scheduling", which allows scheduled location changes with the ability to override them when necessary by means of a "Schedule Override".

In accordance with another feature of the invention, mobility support is provided to subscribers located outside of their normal toll area by enabling calls to be forwarded to the remote location with long distance charges automatically directed to the subscriber's calling card account.

In accordance with another feature of the present invention, mobility support is provided by a "Shared Phone Call Announcing" service which allows the subscriber to send calls to locations which are not exclusively used by the subscriber.

In accordance with another feature of the present invention, the personal communication system supports subscribers by providing incoming call management.

In accordance with another feature of the invention, incoming call management is provided with a "Special Callers List" feature to identify those callers who should receive forced urgency, call announcing, or call blocking treatment.

In accordance with another feature of the invention, incoming call management is provided with use of Calling Line Identification (CLID) feature for routing or providing special treatment of incoming calls, according to their CLID in conjunction with "Special Callers List" features.

In accordance with another feature of the invention, incoming call management is provided with a "Subscriber Interruptability" feature which allows the subscriber to establish the urgency of calls they are willing to accept, that is, normal, priority or emergency calls.

In accordance with another feature of the invention, incoming call management is provided with a "Call Completion Query" feature, which, if desired by the subscriber, allows callers to determine how their call is to be routed if the subscriber can't be reached.

In accordance with another feature of the invention, incoming call management is provided with an "Operator Service" feature which, if desired by the subscriber and permitted by the system provider, allows callers to be connected to a system or private operator, (e.g. secretary).

In accordance with another feature of the invention, incoming call management is provided with a "Subscriber's Schedule" feature which can be used by the subscriber to automate regular changes in the urgency of calls they wish to accept.

In accordance with another feature of the invention, incoming call management is provided with a "Schedule Override" feature which allows the subscriber to easily depart from their normally scheduled call management service.

In accordance with another feature of the invention, incoming call management is provided with a "Call Completion Treatment Schedule" feature which can be used by the subscriber to indicate the treatment provided to the caller at various times when the subscriber cannot be reached.

In accordance with another feature of the invention, incoming call management is provided with an Internal or External "Messaging Service" which provides voice messaging functionality when the subscriber cannot be reached or does not wish to be disturbed.

In accordance with another feature of the invention, incoming call management is provided with an "Announcement of Caller Identification" which allows subscribers to make the decision to take a call once they know who is calling.

DESCRIPTION OF THE PREFERRED EMBODIMENT

In the present specification, Personal Number (PN), is the term used for the single number used to access someone regardless of their physical location. The portion of the system providing PCS to an individual subscriber is referred to as that subscriber's Personal Agent (PA).

A number of network functions or configurations are required for PCS features to work properly or most efficiently. It will be evident from those knowledgeable in the art that additional network functions and enhancements can be made with the proper modifications of the network configuration. The following are network functions or configurations and the PCS features that they enable or enhance:

Calling Line Identification (CLID), when a subscriber is calling allows the subscriber service control interface to more efficiently identify the subscriber and/or the subscriber location. Also, when someone is calling the subscriber, CLID allows the PCS to manage calls based on the calling number and the special callers list. Without CLID, callers will require passwords to identify themselves to the system, which will require the callers to have DTMF signalling. Failing this, the subscriber's PA will have to act as if the caller is unidentified.

PN setup. When an existing number is reconfigured to be the subscriber's PN, a new number will be required for the location previously addressed by the PN. If this is not provided, PCS will not be able to terminate calls to the subscriber at that location due to destination looping.

Location configuration. When a subscribers identify themselves at a location, PCS expects calls to that location to ring unanswered, ring busy, or be answered by a human.

PCS Bypass. When PCS Bypass is enabled for a location/device mn the subscriber s list, care must be taken to configure that location/device so that unanswered and/or busy calls are returned to PCS.

Figure 1A:
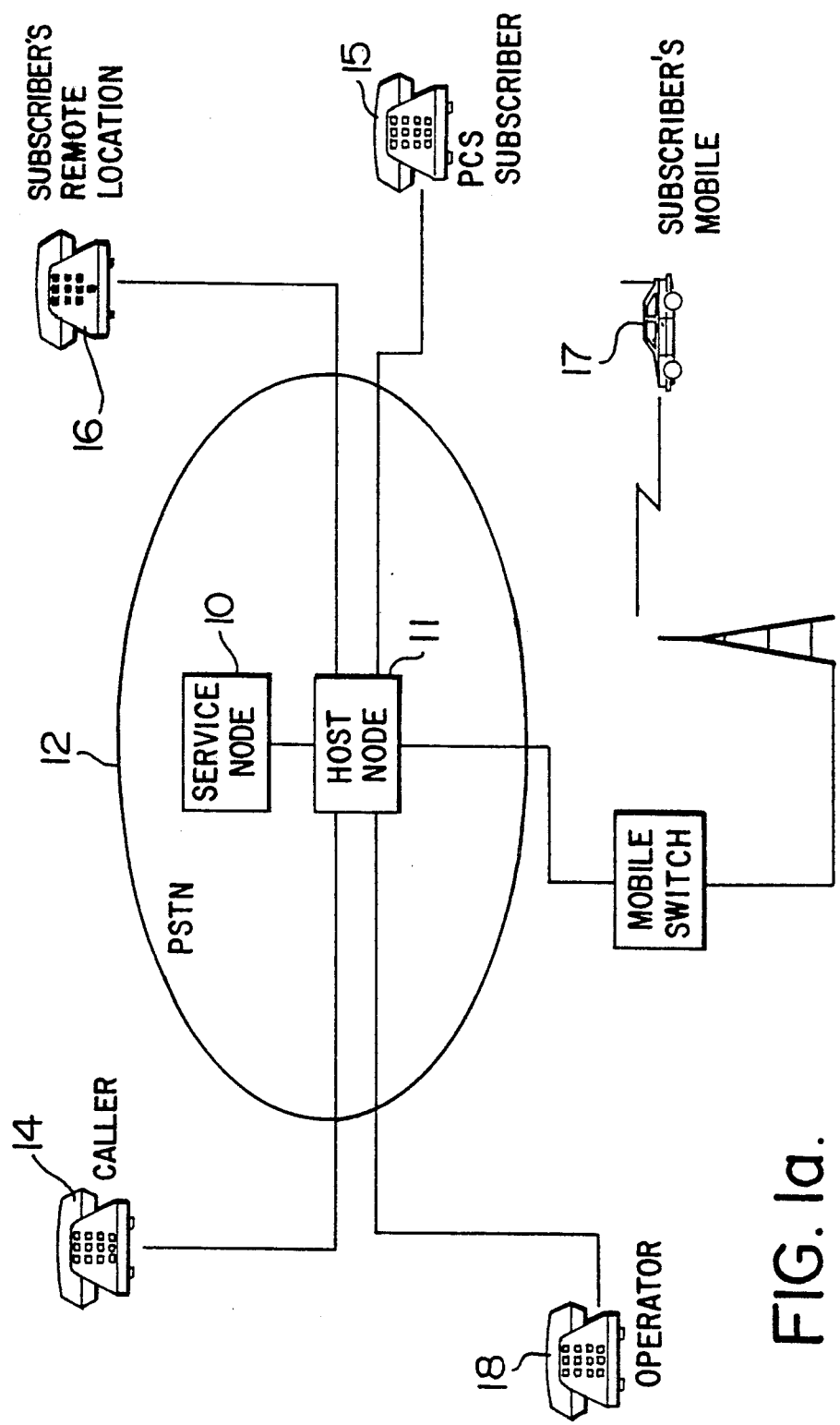
FIG. 1a is a block diagram showing the interaction of the PCS service node within the Public Switched Telephone Network.

As is shown in FIG. 1a, a service node 10 for providing PCS services is connected to a host node 11 forming part of the Public Switched Telephone Network (PSTN) 12. The host node 11 can, for example, be comprised of a central office switch, such as a DMS-100 (Trademark) digital telephone switch, available from Northern Telecom. When a caller 14 dials the personal number (PN) of a PCS subscriber 15, the call is intercepted by the host node 11 as being a call directed to a PCS service subscriber. From this point on, the service node 10 will interact with the host node 11 to attempt call completion according to the subscriber's profile contained at the service node 10. This can be, but is not limited to, either one of the subscriber's base location 15, remote location 16, subscriber's mobile telephone 17, subscriber's voice messaging service (not shown) or operator 18.

Figure 1B:
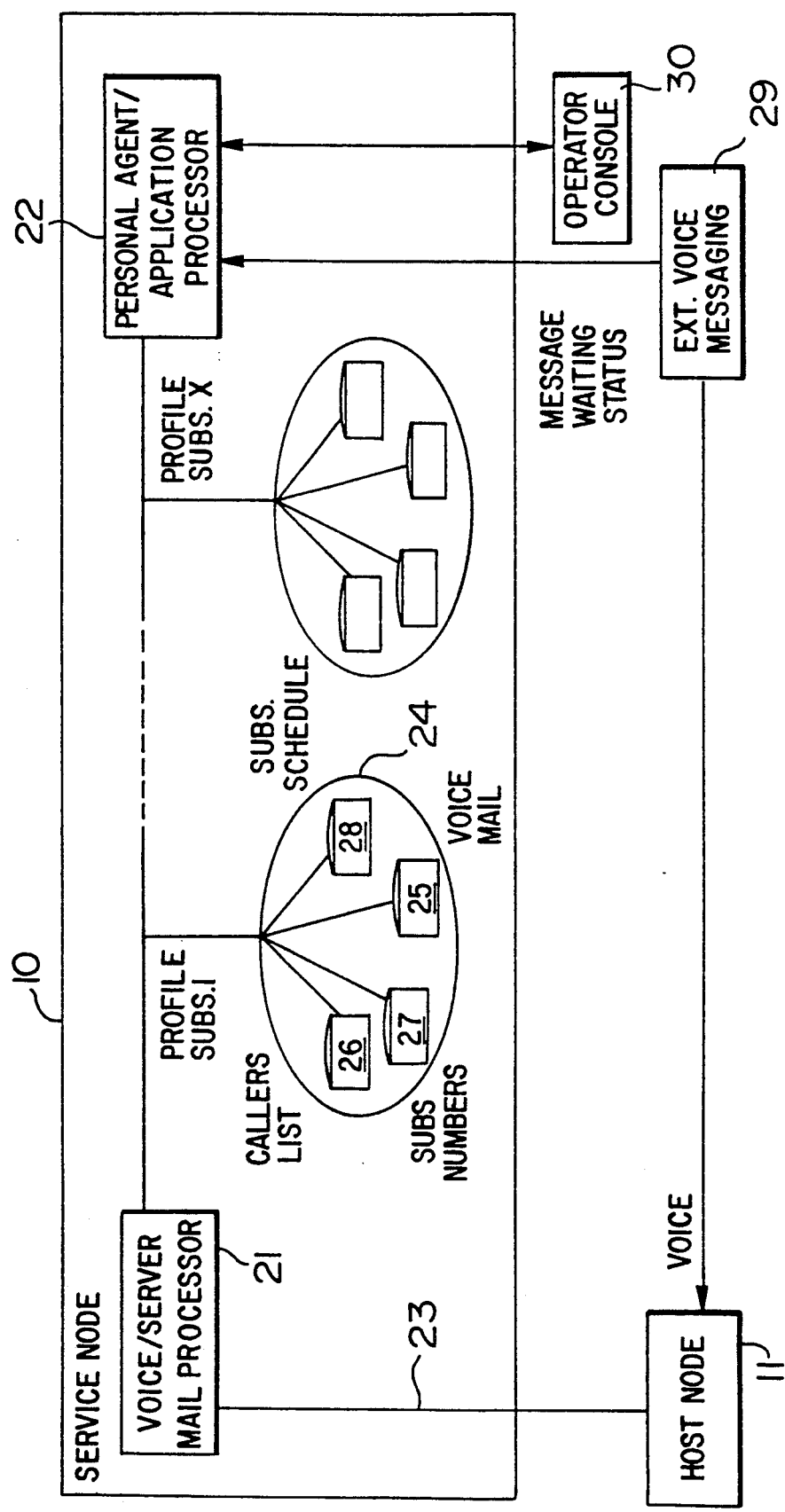
FIG. 1b is a block diagram of an embodiment of the service node for providing the personal communication services of the present invention.

As shown in FIG. 1b, the service node 10 interacts with the host node 11, by making use of a voice/server mail processor 21 and a personal agent/application processor 22 used for accessing service profiles 24 of one or more subscribers. These components are currently available from Northern Telecom, as Meridian Mail Voice Processor (MMVP), and dual processor Meridian Application Equipment Module (AEM). Meridian is a Registered Trademark of Northern Telecom.

Network connectivity and switching functions can be carried out by a voice switch (not shown), or host node 11. The service node 10 is connected to host node 11 and the network 12 via an ISDN Primary Rate Access (PRA) link 23, or an equivalent link able to carry voice and signalling information. This link transports call information between the service node 10 and the host node 11. Call information includes the original dialled number, calling line identification, call redirection information, called number, etc.

The personal agent/application processor 22 makes use of databases 24 which contain the service profiles of the PCS subscribers, for providing the subscriber with communication mobility and incoming call management. Database 24, can either form an integral part of the application processor 22, voice processor 21 or be part of a separate storage facility. One of the files making up the subscriber's profile is the voice messaging file 25. This file contains information about the subscriber's voice messaging service, such as what types of message will be played, access codes required for accessing voice mail from a remote location, etc.

Another file which makes up the subscriber's profile is the Callers List 26. This list stores the identities of callers requiring special treatment, and the special treatment that is provided to them. Callers can be identified by CLID, or by an Identification Password entered through DTMF. An Identification Password can be given by the subscriber to a group of callers, allowing all of them access to the same special treatment, without the subscriber having to individually identify them all on the Caller List 26. A special treatment can be a System Announcement, in situations where the subscriber does not wish to communicate with the caller, or Messaging if the subscriber is willing to take messages from the caller but does not want to have the caller directly connected. Also, a special treatment can give a call a Normal, Priority, or Emergency status, if the call is to be forced to a specific status level. CLIDs can be specified by range, allowing the subscriber to give special treatment to a group of callers, e.g. all callers in local area code are routed to Messaging. A name can be associated with each entry in the list. This name is used to help in any list validation and simplify communication of subscriber requirements to the service administrator.

An example of a typical Caller List is shown below in Table 1.0

TABLE 1.0

| NUMBERS | NAME | PASSWORD | SPECIAL TREATMENT |
|---|---|---|---|
| 123-1111 | GRANDMA | | PRIORITY |
| 444-1212 | X-SPOUSE | | MESSAGING |
| 444-1313 | | | |
| 521-1212 | X-SPOUSE'S LAWYER | | SYSTEM ANNOUNCEMENT 1 |
| 555-9999 | FAMILY | 911911 | PRIORITY |
| 632-1234 | BOSS | 8020 | PRIORITY, ANNOUNCE |
| 452-XXXX | BRW | | SYSTEM ANNOUNCEMENT 8 |

In table 1.0, "Numbers" show the CLID(s) associated with the caller. If a call from this CLID is directed to the subscriber, the special treatment will automatically be provided. If a caller enters a password associated with an entry in the Callers List, that caller will be identified to the subscriber, in a Shared Phone Announcement, by the CLID associated with that password and entry.

"Name" is a text string associated with an entry, for use by the system operator or service representative. It is also provided to the subscribers when a printed copy of the profile is sent to them for verification purposes.

"Password" is a numeric string that can be entered by a caller, and when entered, will provide the caller with the special treatment associated with that entry.

"Special Treatment" is the special handling that callers identified as being associated with this entry will receive. Important callers may receive "Priority" or "Emergency" call status, other callers may be designated to receive only a Messaging treatment, or just one of a set of pre-recorded system announcements.

Referring again to FIG. 1b, another file which also makes up the subscriber's profile is the Subscriber Number List 27. This list stores the network addresses and types of the devices and usual destinations to be used when communicating with the subscriber or leaving a message for the subscriber. The Subscriber Number List can also store the ringing time allowed at each device when attempting to connect a call. This flexibility allows calls to be progressed at the optimal speed. For example, slowly past devices which the subscriber needs time to answer, and quickly past devices which would be answered almost immediately if the subscriber was there to take the call.

An example of a Subscriber Number List is shown below in Table 2.0.

TABLE 2.0

| ID | NAME | NUMBER | TYPE | RINGS |
|---|---|---|---|---|
| 1 | HOME | 123-1234 | BY-PASS ALLOWED | 5 |
| 1 | OFFICE | 555-1234 | SOLE USE | 3 |
| 3 | CAR | 999-1234 | ANNOUNCE CALLER | 2 |
| 4 | COTTAGE | 777-1234 | SHARED | 5 |
| OTHER DEVICES | | NUMBER | | |
| PAGER: | | 551-1155 | | |
| TYPE: | | DIGITAL | | |
| MESSAGE SYSTEM: | | 922-2222 | | |
| MAILBOX NUMBER: | | 1234 | | |
| MAILBOX PASSWORD: | | 555 | | |
| MWI COORDINATION: | | YES | | |
| OPERATOR: | | 333-4567 | | |

As shown in Table 2.0, "IDs" are numbers used to refer to specific devices by the subscriber when changing locations, e.g. only "1#" is needed to identify the subscriber's home location.

"Name" is the pre-determined system name for locations. This can be Home, Car, Portable, Office, Cottage, Boat, etc.

"Number" is the network address of the device.

"Type" indicates whether the Shared Phone Call Announcement should occur when calls are extended to that device/location, or if all calls to that device/location should have the caller announced, or if the device can be "by-passed" (this indicates whether PCS can bypass itself when a call is directed to this location when filtering or call announcing is not required).

"Rings" indicates how long a device should be rung before "no-answer" is assumed.

"Other Devices" include the possible destinations for completing calls when a subscriber can't be reached. These can be a pager, a messaging system, or a private operator. Sufficient information is provided to allow PCS to complete the call to these destinations.

Also part of the subscriber's profile is the Subscriber's Schedule 28. Some subscribers may wish to change, at regular intervals, the way their calls are managed, e.g. only emergency calls after 11 p.m. weekdays and after midnight on weekends. Further, they may have a pattern of movement from device to device which can also be described in a schedule. The Subscriber's Schedule allows, for example, the elimination of subscriber and/or operator interaction to support regularly occurring changes. Multiple time slots can be specified, e.g. Monday-Friday 0900-1700 hours, Saturday 1030-2330 hours, and "other" which defines what happens for non-specified time slots. For each of these predefined time slots, the Schedule can list the default devices to use in contacting the subscriber during that time, e.g. Monday-Friday 0730-0800 hours use car or home number, Monday-Friday 0800-0830 hours use car or office number. This schedule could be set for the subscriber who spends half an hour commuting each morning, leaving sometime between 8:00 and 8:30 a.m.. Similarly, the Schedule allows each slot to have an urgency of calls which the subscriber will accept, e.g. only urgent calls after 5 p.m. on weeknights and on weekends. Those subscribers who do not use scheduled changes can have a single, all-inclusive entry in their schedule, indicating their default location and interruptability.

An example of the Subscriber Schedule is shown below in Table 3.0.

TABLE 3.0

| DAY | TIME | INTERRUPT-ABILITY | DEVICES |
|---|---|---|---|
| M-F | 8-9 | NORMAL | CAR, OFFICE |
| M-F | 9-17 | NORMAL | OFFICE |
| M-F | 17-23 | PRIORITY | HOME, CAR |
| SA-SU | 9-17 | PRIORITY | HOME, CAR, COTTAGE |
| DS-SU | 17-23 | PRIORITY | HOME, CAR |
| OTHER | | EMERGENCY | HOME |

"Day" and "Time" are used to determine which time period(s) and entry in the schedule applies to.

"Interruptability" indicates the urgency of calls that the subscriber will accept during the time period(s) specified by the entry.

"Devices" indicates which device(s)/location(s) are to normally be used when attempting to connect to the subscriber during the time period(s). Names refer to entries in the Subscriber Number List.

In addition to the Subscriber Schedule, a Call Completion Schedule is used to determine what action the system should take with a call when the caller is normally allowed to reach the subscriber, but the subscriber couldn't be reached, or was not interruptible. Table 4.0 shown below provides an example of a Call Completion Schedule.

TABLE 4.0

| DAY | TIME | TREATMENT | URGENCY |
|---|---|---|---|
| M-F | 9-17 | MESSAGE | NORMAL |
| M-F | 9-17 | OPERATOR | PRIORITY |
| M-F | 17-23 | QUERY (MESSAGE, PAGER) | PRIORITY |
| M-F | 17-23 | MESSAGE | NORMAL |
| SA-SU | 8-20 | QUERY (MESSAGE, PAGER) | PRIORITY |
| SA-SU | 8-20 | MESSAGE | NORMAL |
| OTHER | | MESSAGE | NORMAL |
| OTHER | | QUERY (MESSAGE, PAGER) | EMERGENCY |

"Day" and "Time" indicates which days and over which time ranges a particular treatment will be provided to a caller. "Other" is used to refer to all times not otherwise specified.

"Treatment" indicates what should be done with a call that could not be terminated by connecting it to the subscriber. Options are "Message", "Pager", "Operator", and "Query". "Query" treatment results in the caller being asked for his choice of 2 or more of the 3 available treatments.

"Urgency" indicates that only calls of at least the specified urgency are to receive that treatment. This allows calls of different urgencies to be terminated differently, e.g. to an operator (secretary) or to messaging.

Also part of the subscriber's profile are other Data files which store other subscriber information necessary to operate PCS or provide the subscriber with prompt and courteous operator service. An example of this data is shown below in Table 5.0.

TABLE 5.0

| | |
|---|---|
| PERSONAL NUMBER: | 416-555-1111 |
| BYPASS ACCESS: | 416-555-9999 |

TABLE 5.0-continued

| | |
|---|---|
| BYPASS PASSWORD: | 12345 |
| NAME: | SUBSCRIBER NAME |
| PASSWORD | 1234 |
| OTHER PERSONAL #S: | |
| MESSAGING PASSWORD | 9876 |
| CALLING CARD #: | 416 555-1212 XXXX |
| LANGUAGE: | ENGLISH |
| ALLOWED FEATURES: | PAGER, SYSTEM OPERATOR REVERT, URGENCY |
| CALL ANNOUNCE NAME RECORDING: | NO |
| CALL URGENCY QUERY: | PRIORITY |
| ROTARY DEFAULT: | NORMAL |
| NOTES: | CUSTOMER IS HARD OF HEARING - SPEAK SLOWLY AND CAREFULLY WHEN GIVING ASSISTANCE |

"Personal Number" is the PN of the subscriber.

"Bypass Access" and "Bypass Password" are used to directly route the Personal Number to an allowed subscriber location, using a network based forwarding feature.

"Other Personal #(s):", "Name", and "Notes:" are examples of textual comment fields which can be associated with the subscriber profile to facilitate service.

"Password" is the identification number for the subscriber, which can be used for operator verification of subscriber identity, or when the subscriber is calling the Subscriber Service Interface.

"Calling Card #" is used to charge PCS placed calls when the subscriber has directed calls to a location not local to the host node 11.

"Language" is the language to be used for the playing prompts to Subscriber's callers.

"Allowed Features" indicates which features this subscriber has access to. The options listed in Table 5.0 are for example only, and may vary according to what is specified by the PCS service provider.

"Call Announce Name Recording" indicates whether unknown callers should be prompted to record their names when Call Announcing is required.

"Call Urgency Query" can be "none", "priority", or "emergency". If "none", calls which are not assigned an urgency in the caller list will always be assumed "normal".

A Schedule Override feature has been provided since many subscriber's schedules are subject to variations. This override allows the subscriber to adjust the schedule for current circumstances without having to permanently change the schedule. For example, the subscriber can shift the next or previous scheduled change so that they occur earlier or later, or for all scheduled changes to be suspended until a future date/time. This, for example, can be useful when the subscriber is off sick, on vacation or just running a little late. Similarly, while a subscriber may normally desire that only urgent calls be connected after 5 p.m., he may wish to extend that when waiting for calls which the system will not be able to identify as urgent.

When a subscriber overrides his scheduled location to a location not in the device/location list, the new location will be assumed to be "shared", with PCS confirming that the subscriber is at the location before connecting the call. In this example, if three calls to the location are made, and no DTMF response is received by PCS to the confirmation request, or if the response indicates that the relocation is to be cancelled, PCS will cancel the location override and resume with the location specified in the schedule.

As is shown in FIG. 1a, incoming calls can be directed to standard permanently installed telephones 15, mobile telephones 17, a messaging service (reference numerals 21 and 29 of FIG. 1b), a system or private operator 18, numeric/digital pager or voice pager (not shown). If an incoming call is directed to a telephone which may be answered by someone other than the subscriber, then the telephone is specially indicated as being shared. Calls to this destination are provided with a Caller Announcing feature. Of course, calls to any other telephone devices may also be provided with the Call Announcing feature. Call completion at these devices requires DTMF verification at the destination that the subscriber is on the line and wishes to take the call before a caller is connected.

The PCS can transfer a call directed to a subscriber to a pre-determined external messaging system 29. If necessary, the PCS can enter the subscriber's mailbox code to prevent the caller from having to do this. Callers to a PCS subscriber whose call is to be sent to messaging will be automatically transferred to that subscriber's mailbox on the internal or external system. The target messaging system should of course be configured to operate this way. To handle caller identification overrides and emergency calls, the PCS will warn the caller to hold while their call is transferred to an external messaging system. The period of warning can be used as the "window" in which a caller can enter an identification password, or "0" for emergency/operator treatment. Subscribers to PCS can log in to their external messaging system by selecting an option in the Subscriber Service Interface. This option will result in PCS placing the subscriber on hold and a call made to the external messaging system. The PCS will then outpulse the subscriber's mailbox number and password and then drop out of the loop.

When a subscriber uses the internal, integrated voice messaging 50, the person-system interface is optimized. No PCS command "window" is required prior to transferring a caller, as the message system's "greeting" is sensitive to the PCS commands and responds appropriately, returning the caller to the PCS application if necessary. Mailbox numbers, passwords, and other information, such as the caller's number and the call's urgency, can be passed between the Personal Agent and Voice Messaging Application processors via the data processor 48 without the delays involved in waiting for an external system to answer and in outpulsing this data via DTMF. The integrated system can allow the subscriber to switch from messaging to PCS, allowing them to change PCS configurations after listening to their messages. The integration and data sharing between the PCS and messaging applications also allows for integrated statistics and billing data to be easily connected.

The PCS can also transfer a call to a PCS system operator, who can access the subscriber's Personal Agent data to determine why the subscriber can't be reached, or provide any other service offered by the operator. Similarly, the PCS can transfer the call to a subscriber defined Private Operator. This could be the subscriber's secretary, an external answering service, or other appropriate destination.

When the call is directed to a Numeric/Digital pager, the pager receives and displays a numeric message entered by the caller. If the caller does not enter a digital code for transmission to the pager, the PCS can provide the pager with the CLID of the caller, if it is known.

The voice pager receives a voice message recorded by the paging system. The PCS can transfer the caller directly to the paging system and leave the rest of the interaction under the control of the paging system.

Another feature disclosed with the present invention is the Hunting feature. There are times when the subscriber may be moving fairly often between a fixed set of locations (e.g. a construction manager who is away from his desk on and off all day, and carries a portable cellular phone with him when he is away). Hunting allows contact to be made with subscribers without the subscribers having to constantly update their locations manually. This feature allows the subscriber to list up to three locations by which the system is to attempt to contact him. The system will normally "hunt" to the next location if the subscriber doesn't answer, or a call to a shared telephone is answered and it is indicated that the subscriber is not there. The system is designed to stop hunting to the next location in the list if a location is busy.

Figure 1C:
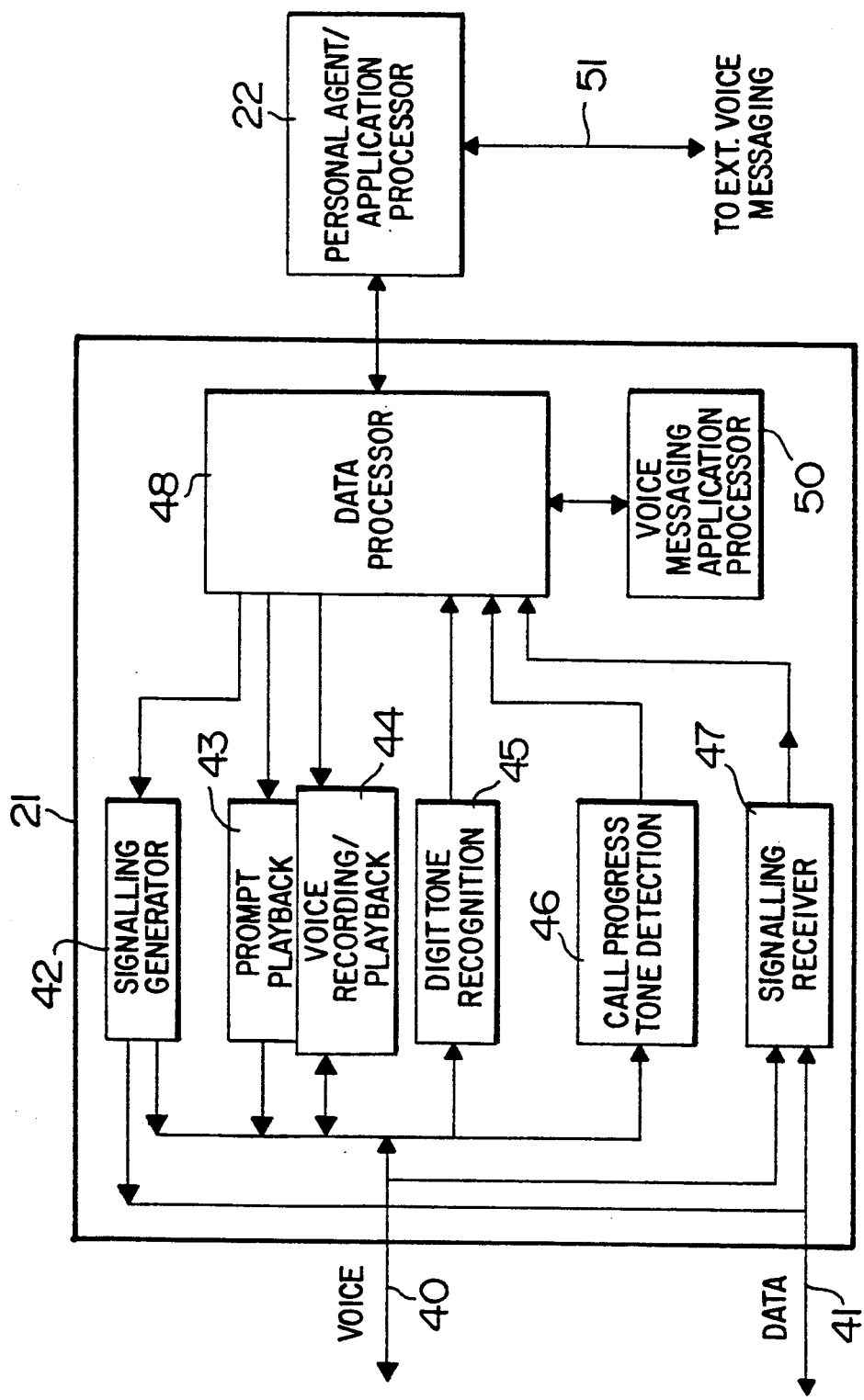
FIG. 1c is a more detailed block diagram of the service node according to an embodiment of the present invention.

Referring now to FIG. 1c, we have shown a more detailed block diagram of the voice/server mail processor 21 of the service node 10. The voice/server mail processor 21 is adapted to receive/send voice information on a voice channel 40 and data or signalling information on a data channel 41. The processor 21 is comprised of a signalling generator 42 adapted to initiate, establish and transfer calls when connected to the data channel 41 and generate DTMF signalling to external devices via the voice channel 40. The external devices can be a pager, or external voice messaging system. A prompt playback unit 43 stores various prompts which are sent to the calling party or the subscriber, when either is communicating with the system. The prompt playback unit 43 sends this information along voice channel 40. These prompts are usually the ones provided by the service provider, such as "The person you are calling does not wish to take calls at this time." or "Welcome to PCS; please hold while we try to connect you to —John Doe—". The voice recording/playback unit 44 is used for the recording and playback of the voice of an incoming caller, when the caller is asked to leave a message, or of the subscriber, when the subscriber wants to modify the welcoming message of his or her voice mail.

The DTMF recognition unit 45 is used to detect and recognize DTMF tones sent by the calling party or subscriber, when either is connected to PCS. The call progress tone detection unit 46 allows the system to detect busy, fast busy, re-order, ringing, etc., when PCS is attempting to place a call. The signalling receiver 47 is used to detect Calling Line Identification (CLID), called number, incoming calls, end of call, reason for call forwarding, etc. The type of information received will of course be dependent on the connection technology used.

The data processor 48 routes information to and from a functional block serving a call, i.e. elements 42 to 47, to the correct application processor. For example, during a PCS call, information is routed to and from the personal agent application processor 49, whereas, during the use of the system's internal voice mail, information is directed to and from the voice messaging application processor 50. The data processor 48 is also used for communicating between the two processors allowing the switching of application and for each application to use data accumulated by the other.

The following description of FIGS. 2a-2g is directed at describing the flow of information at the caller interface. That is, when an individual attempts to contact a PCS subscriber. The precise interface that the caller has with the PCS will depend on the subscriber's requirements and the specific PCS features in use for the subscriber. In some cases, it is possible that the caller will not have any obvious interaction with the PCS, and in others, will respond to Call Completion or Call Urgency Queries and be provided with status information. The caller will normally have available four single-digit DTMF commands. These can, for example, be:

enter password (e.g. the numeral 4 key to prefix the password);
operator assistance request (zero key);
skip over welcome message (#key);
skip directly to messaging (numeral 6 key); and
login - subscriber's calling (key)

Additionally, callers may be requested to make a Call Completion or Call Urgency determination via DTMF signals.

Figure 2A:
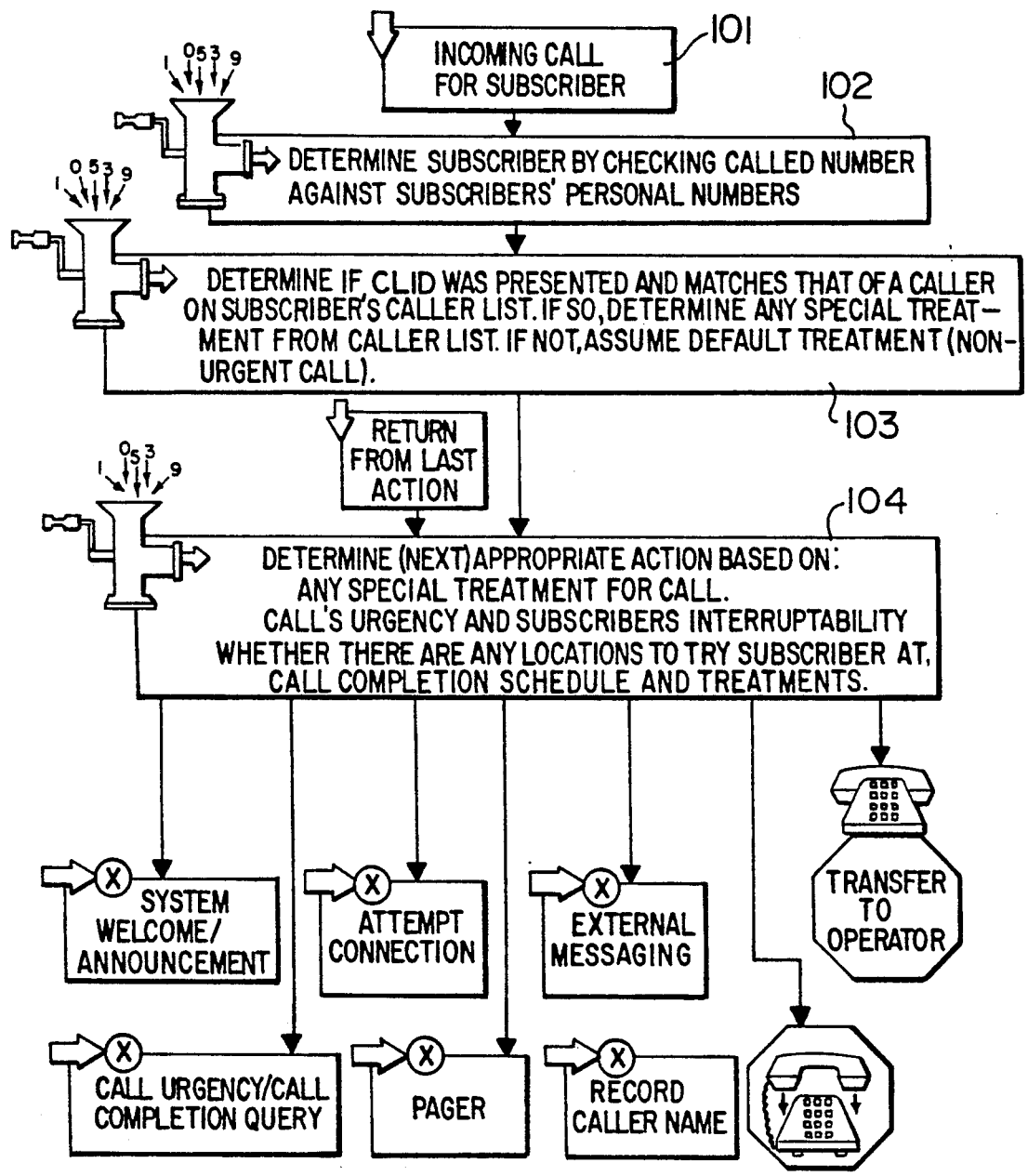
FIG. 2a is a general flowchart of the main caller interface.

In conjunction with FIGS. 1a to 1c, we can now refer to FIG. 2a, where we have shown a flowchart diagram illustrating the general caller interface options that may be available to a caller attempting to reach a PCS subscriber. Once the call has been identified as described above as being directed to a PCS subscriber, block 101, the personal agent 22 of the service node determines which subscriber profile to use, by checking the called number against the personal numbers of all PCS subscribers, block 102. In FIG. 1c, the signalling receiver 47 detects the called number and passes this to PA 22 via data processor 48, allowing the personal agent 22 to access the subscriber profile corresponding to the number called. Then, as described at block 103, the signalling receiver 47 and data processor 48 of service node 21 determines if the incoming call included the CLID. If there is a CLID, the personal agent 22 would access the profile 24 of the subscriber to determine whether the CLID matches that of a caller on the subscriber's Caller List 26. If so, then as shown at block 103, any special treatment is determined from the Caller List (see Table 1.0). If not, the default treatment is assumed, i.e. a non-urgent call.

Figure 2B:
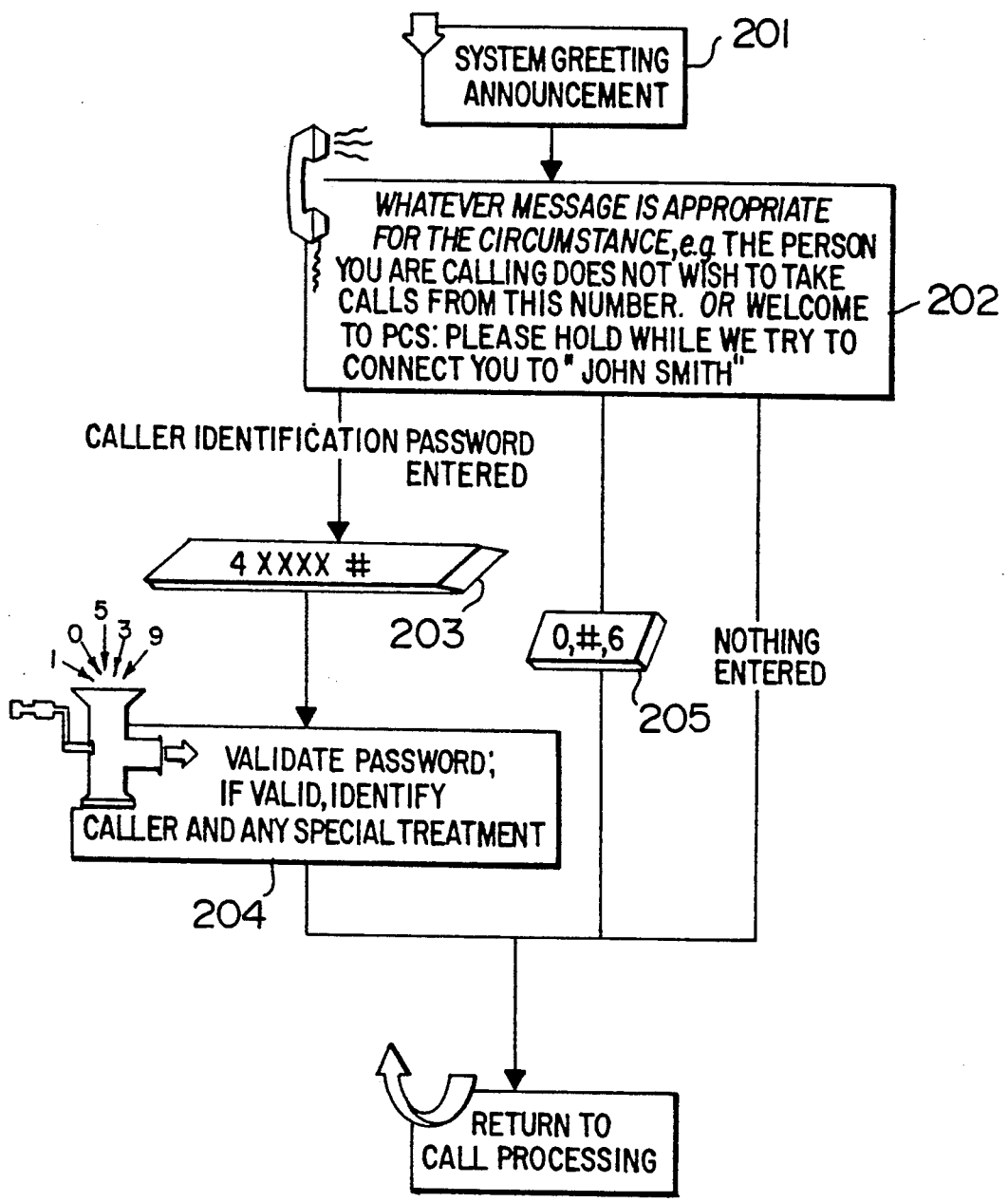
FIG. 2b is a general caller interface flowchart showing the system greeting/announcement service.

Referring now to FIG. 2b, if the appropriate treatment is a System Greeting/Announcement 201, the caller will be connected to PCS and a voice channel 40 will become available. The personal agent 22 will instruct the data processor 48 to activate the prompt playback 43 to play the appropriate message 202. The message played to the caller again will depend on the CLID, or default treatment. Whenever a caller is hearing a PCS prompt 202, including a Call Completion Query or Call Urgency Query, they can enter an Identification Password 203 (assuming they have knowledge of one). This associates the caller with a CLID in the Special Caller List, and gives the caller the same Priority or Emergency call service associated with that CLID. This identification mechanism allows callers to receive this Priority or Emergency treatment when calling from another number or when CLID is not provided, or to override the default treatment when circumstances warrant. If the caller does enter an ID password 203, it will be detected by the DTMF detection circuit 45. The information would be passed via data processor 48 to the personal agent 22 allowing it to determine or confirm the identity of the caller 204 and the treatment to be provided. Also, the caller can enter other single digit commands 205, for introducing a password, skipping greetings, and immediate messaging. Again, depending on the digits, the DTMF recognition circuit 45 and data processor 48 would alert the personal agent 22 of the caller's input for the necessary treatment. If nothing is entered, the call would be processed as per the default treatment, i.e. messaging or prompt.

Figure 2C:
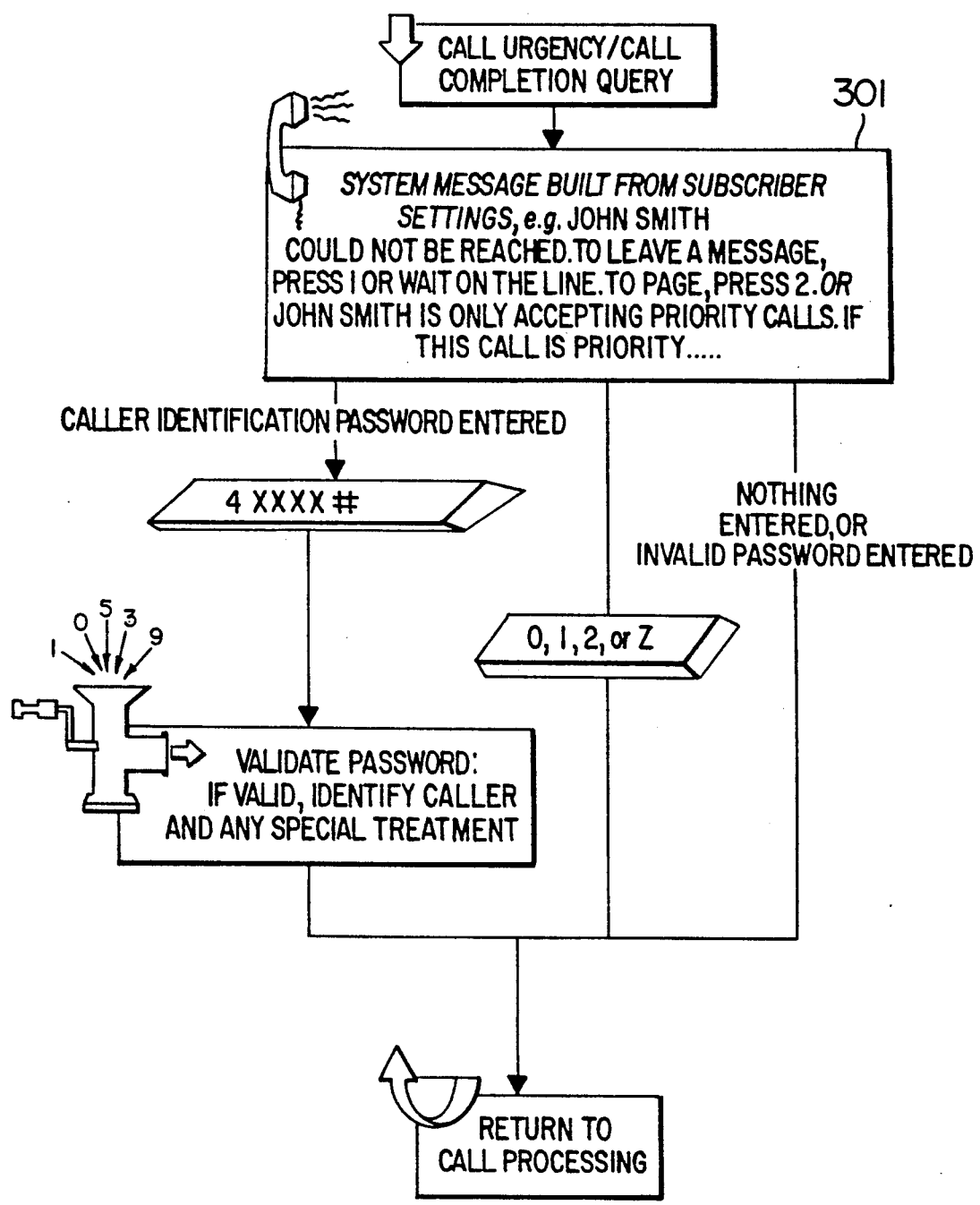
FIG. 2c is a general caller interface flowchart showing the call urgency/completion query service.
Figure 2D:
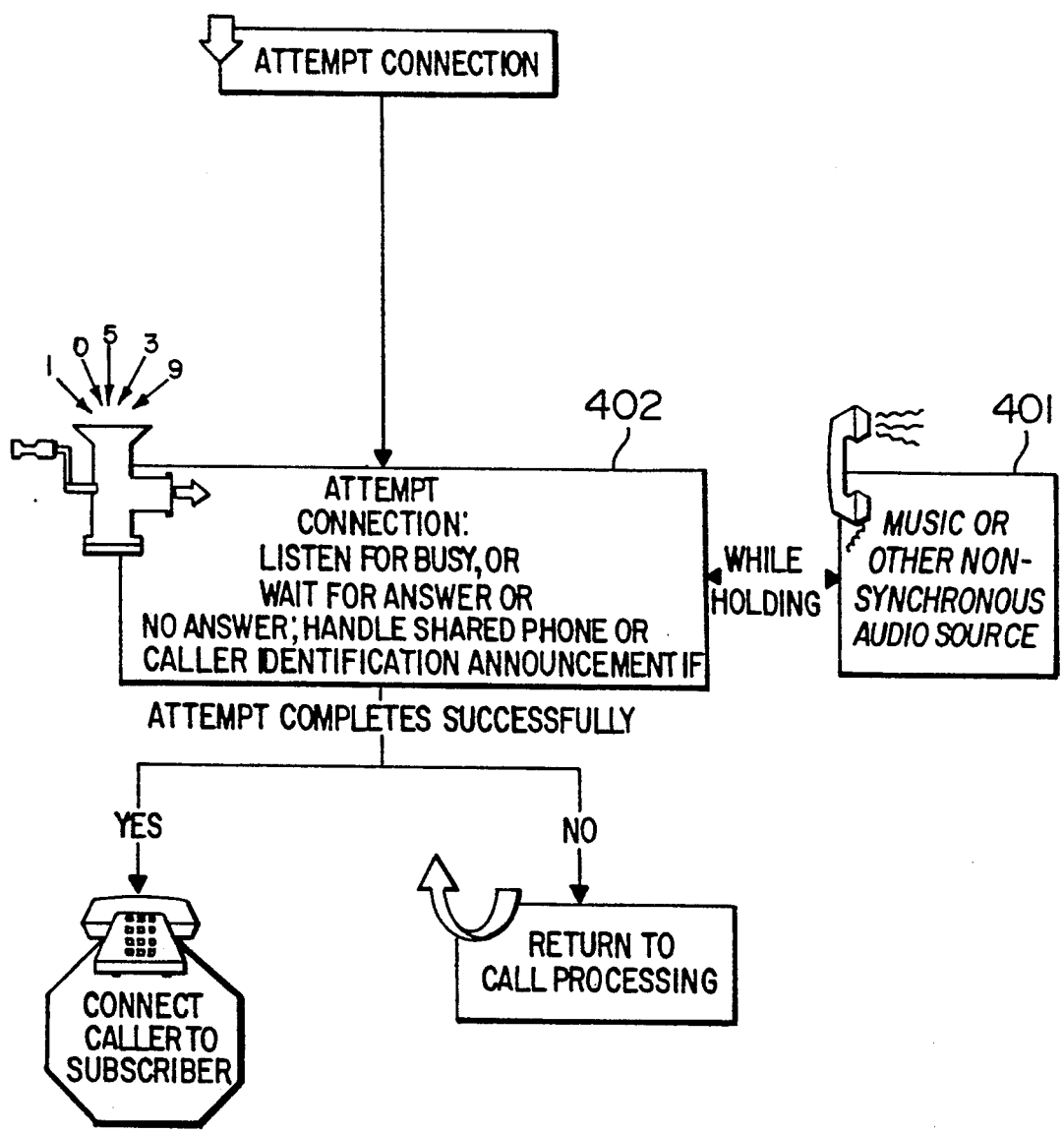
FIG. 2d is a general caller interface flowchart showing the caller attempt connection.

Callers can be queried by the system, as shown in FIG. 2c, if desired by the subscriber. For example, as shown at block 301, the caller can be asked their choice of leaving a message for the subscriber or paging the subscriber. Caller responds by keying a digit. A query can also indicate that the subscriber has requested that only "priority or emergency" calls be accepted, and ask the caller to use DTMF to signal if their call is of that level of importance. The query allows for appropriate defaults so that callers incapable of responding can be handled.

Some subscribers may have a requirement for their callers to be given a choice of routing when the subscriber cannot be reached, i.e. Call Completion Query. If a subscriber has requested this feature, the system will automatically query the caller as to which routing they desire. For example, calls can be routed to messaging, a pager (either voice or digital) or an operator.

Callers are not given any progress indication once the system has welcomed them and is handling their call, unless the system cannot connect the call to the subscriber, in which case, a prompt informing the caller is issued, and the completion treatment is performed. During this period, the system can be set-up so that the callers hear a non-synchronous audio source, as shown at block 401 of FIG. 2d. This could be music, or a custom recording.

When a connection with the subscriber is attempted, the personal agent 22, will provide the necessary signalling information to the data processor 48 so that the signalling generator 42 can initiate a call according to the subscriber's profile. This information, will be the result of the subscriber's schedule 28, subscriber's number list 27, the treatment provided to the caller and other appropriate data. As shown at block 402, the system will listen for a busy tone or wait for an answer or no answer. This is accomplished by the call progress tone detection 46. The call attempt will be made using one of the data or signalling channels 41 and a voice channel 40. If the call is made to a shared phone or callers announcement is required, the proper prompts will be played to the person answering the call. The calling party will only be connected to the far end if it is answered and, when necessary, the subscriber accepts the call by DTMF signals.

Figure 2E:
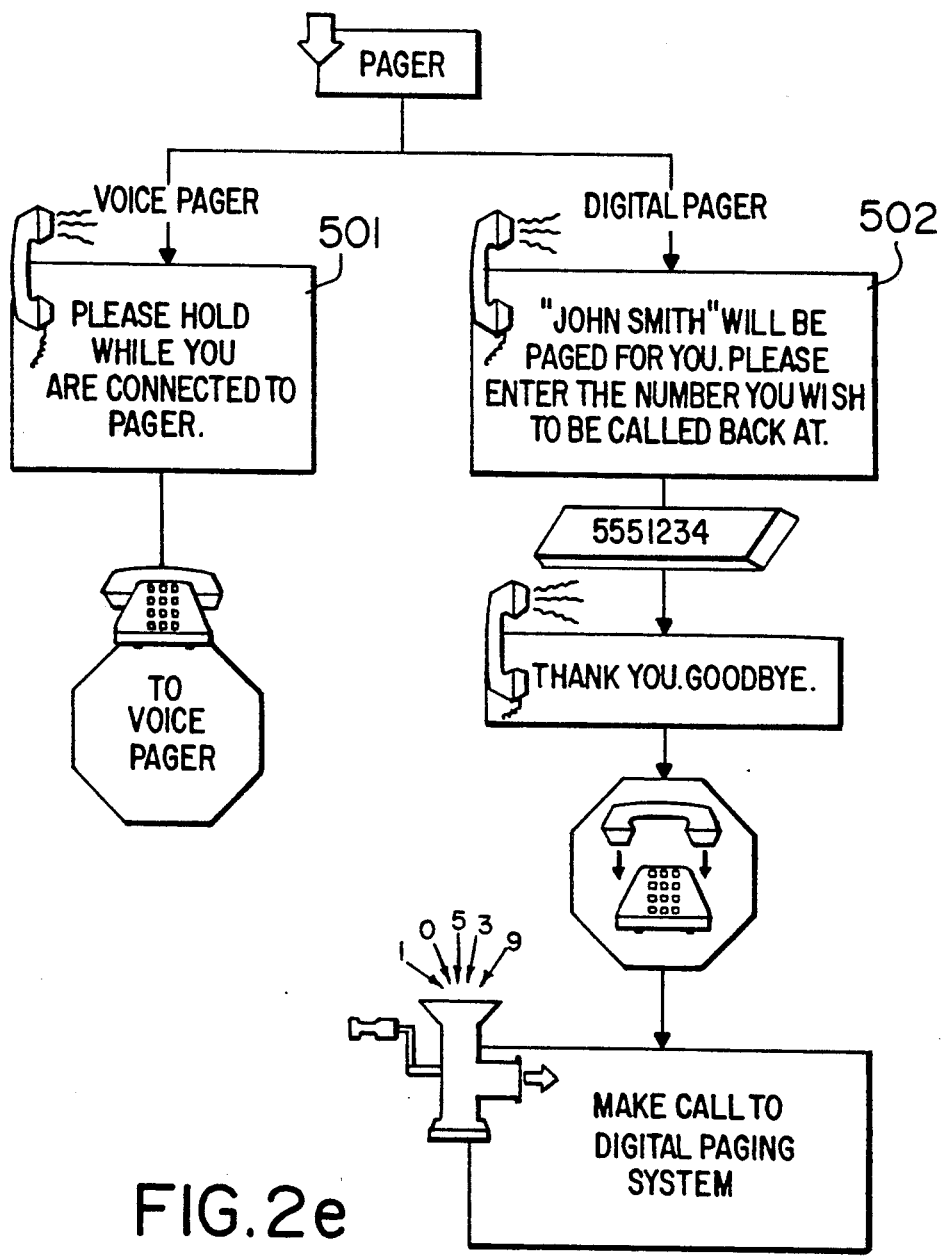
FIG. 2e is a general caller interface flowchart showing how a call is directed to a pager.
Figure 2F:
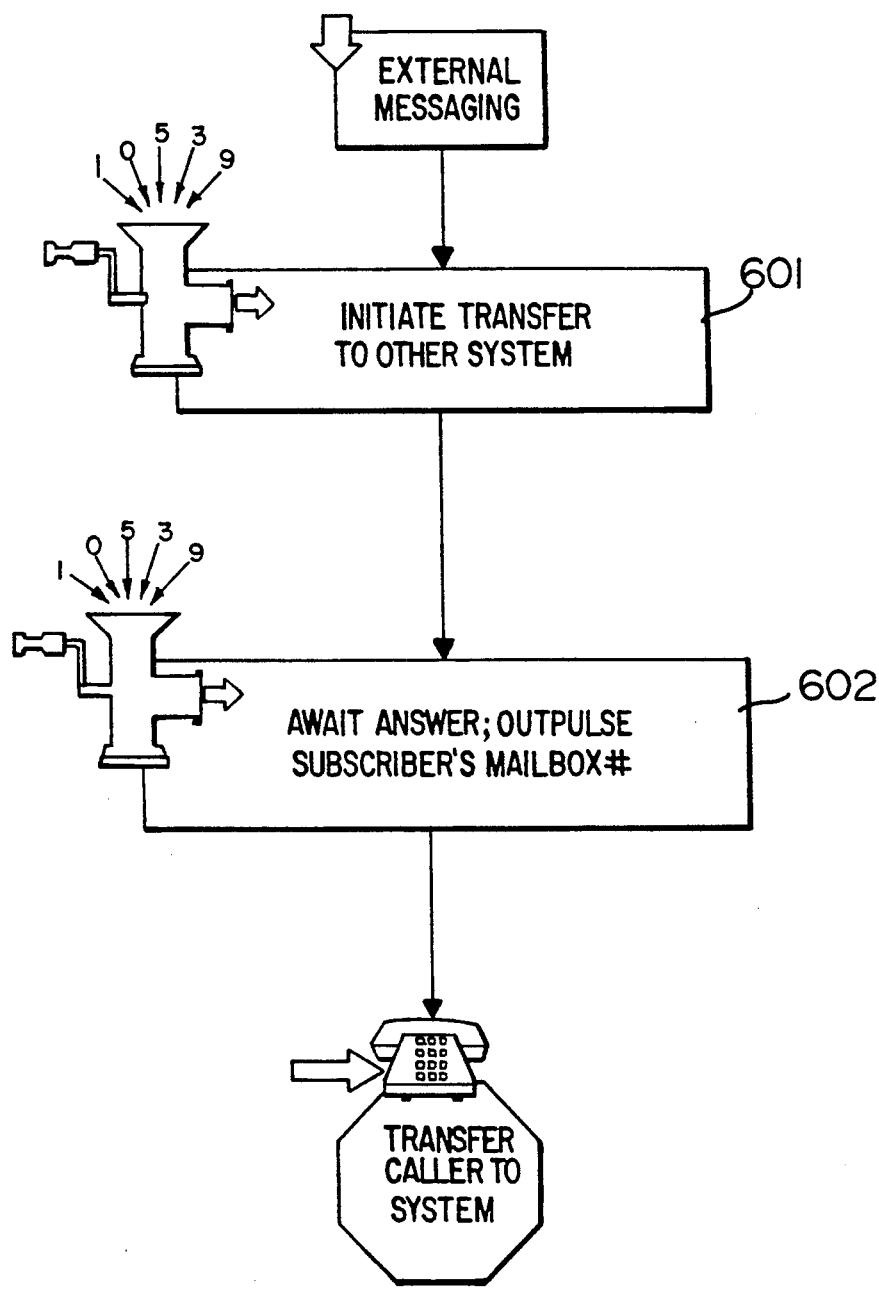
FIG. 2f is a general caller interface flowchart showing how a call is directed to an external messaging system.

Calls directed to voice or digital pagers and external messaging systems are processed as shown at block 501 and 502 of FIG. 2e and at blocks 601 and 602 of FIG. 2f, respectively. In either one of these cases, the signalling generator 42, would be directed by the personal agent to call the pagers or external messaging number and a call completion attempt will be made as described above.

Figure 2G:
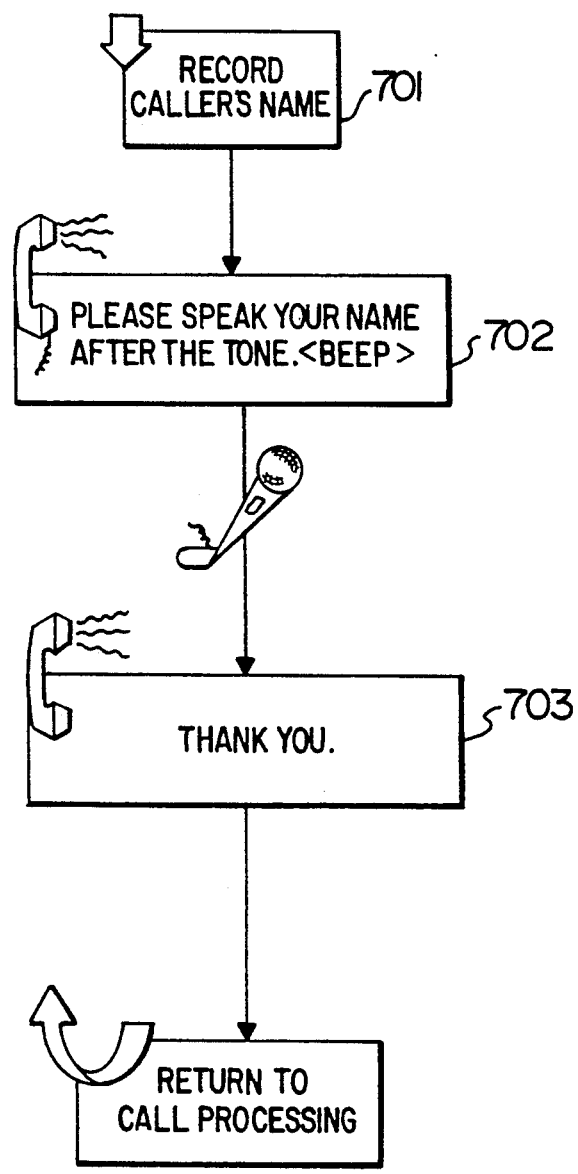
FIG. 2g is a general caller interface flowchart showing how a caller's name is recorded.

When a Caller Identification Announcement is required with caller name recording, the call will be processed as shown at block 701-703 in FIG. 2g. In this case, the voice recording/playback unit 44 will be activated to record the caller's voice. Once the subscriber answers the call, the voice recording/playback unit will play the caller's voice to announce the caller to the subscriber.

The following description of FIGS. 3a-3e is directed at describing the flow of information for the Subscriber Service Interface when a subscriber attempts to access his or her PCS subscriber profile. The Subscriber Service Interface is directly accessed by the subscriber calling a special number, or by calling his own personal number and pressing *. This interface shows the possible mechanisms for the subscriber to control some of his most dynamic data. The interface would change depending on which features were provided to the subscriber(s). Of course, the system data and profile changes can also be done by a system operator, at the subscriber's request.

Figure 3A:
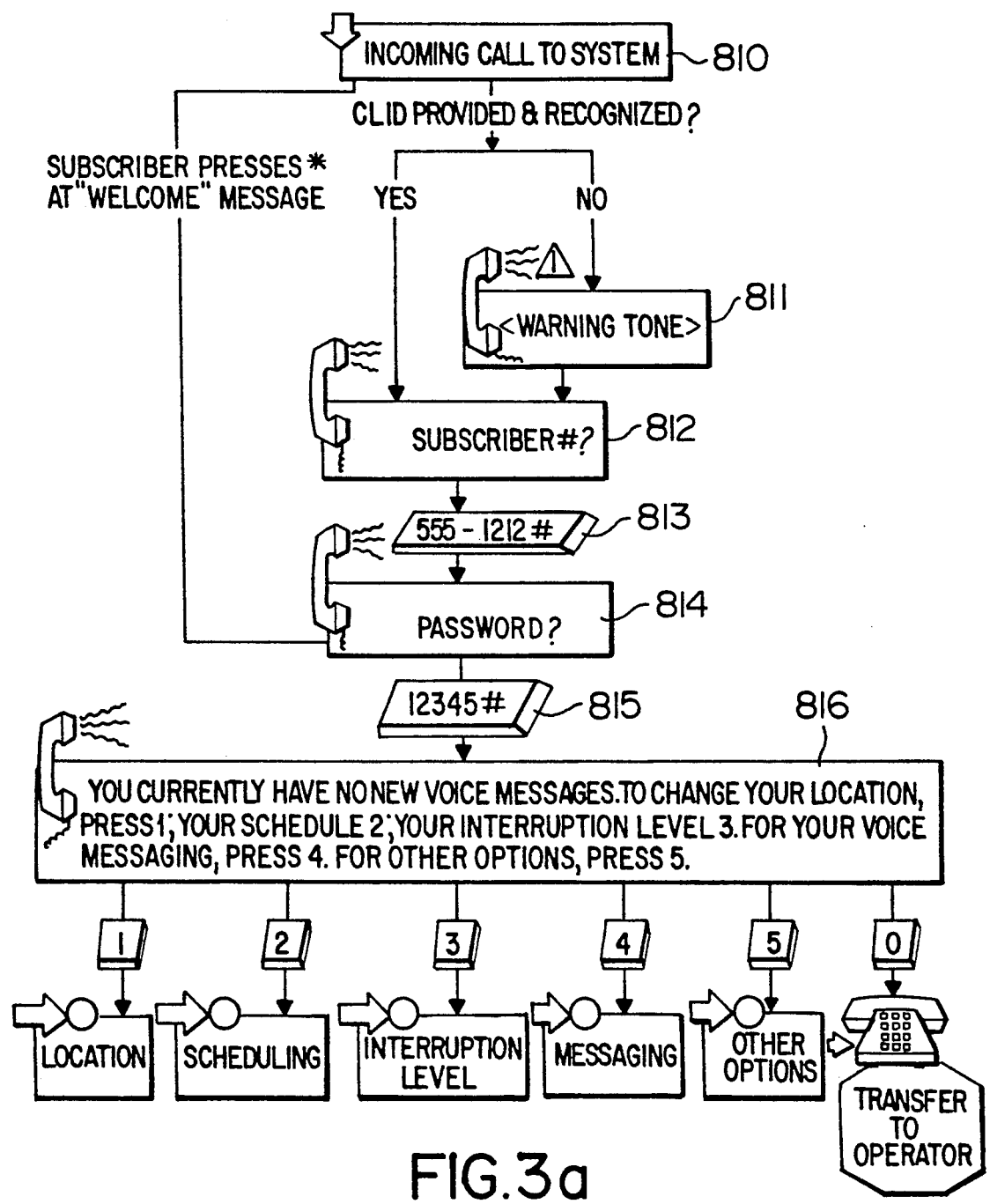
FIG. 3a is a general subscriber service interface flowchart showing how the main menu is accessed.

When a subscriber places a call into the PCS system, block 810, the subscriber's CLID, if known, allows the subscriber service interface to more efficiently identify the subscriber and/or the subscriber's location. If the calling number is not known, e.g. in a situation where the subscriber calls from, say a pay phone, a warning tone is heard to indicate the CLID is not known and the subscriber has to enter his or her subscriber number, see block 811-813. Subsequently, the subscriber is prompted for a password, see block 814-815. With reference to FIG. 1c, when the subscriber dials the special number, the signalling receiver will connect the subscriber to the personal agent 22. The subscriber will then be able to "communicate" with the personal agent via the prompt playback unit 43, voice recording/playback unit 44 and the DTMF recognition unit 45. Thus, the subscriber and the personal agent 22 will interact using interactive voice response. That is, depending on the DTMF entered, a system prompt or voice response will be heard by the subscriber, leading the subscriber through the various options available. This is shown in FIG. 3a, at block 816.

If the subscriber has access to a messaging system, then a notification of messages waiting (or not) will be made available to the personal agent and subscriber via a Message Waiting Indicator link 51 from an extension system 29 or via the data processor 48 from the voice messaging application processor 50.

Figure 3B:
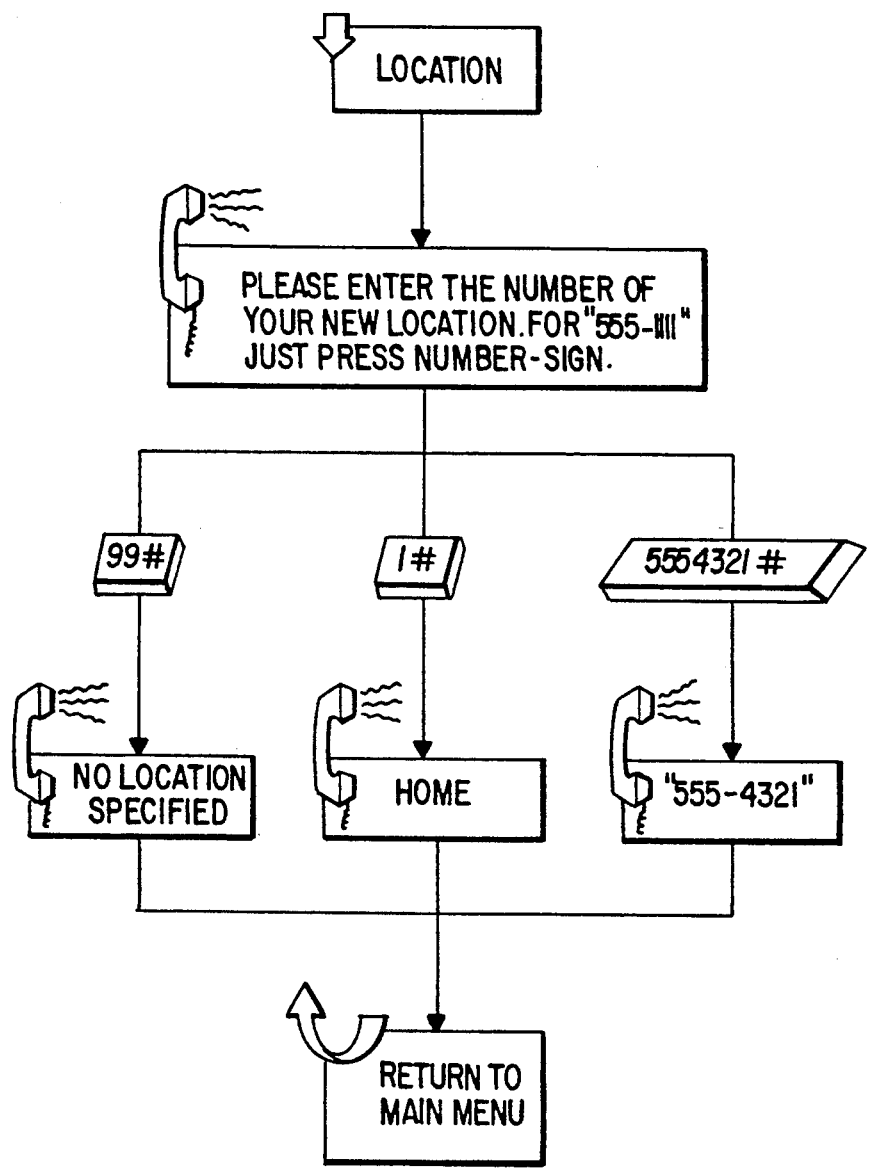
FIG. 3b is a general subscriber service interface flowchart showing how to specify a new location.
Figure 3C:
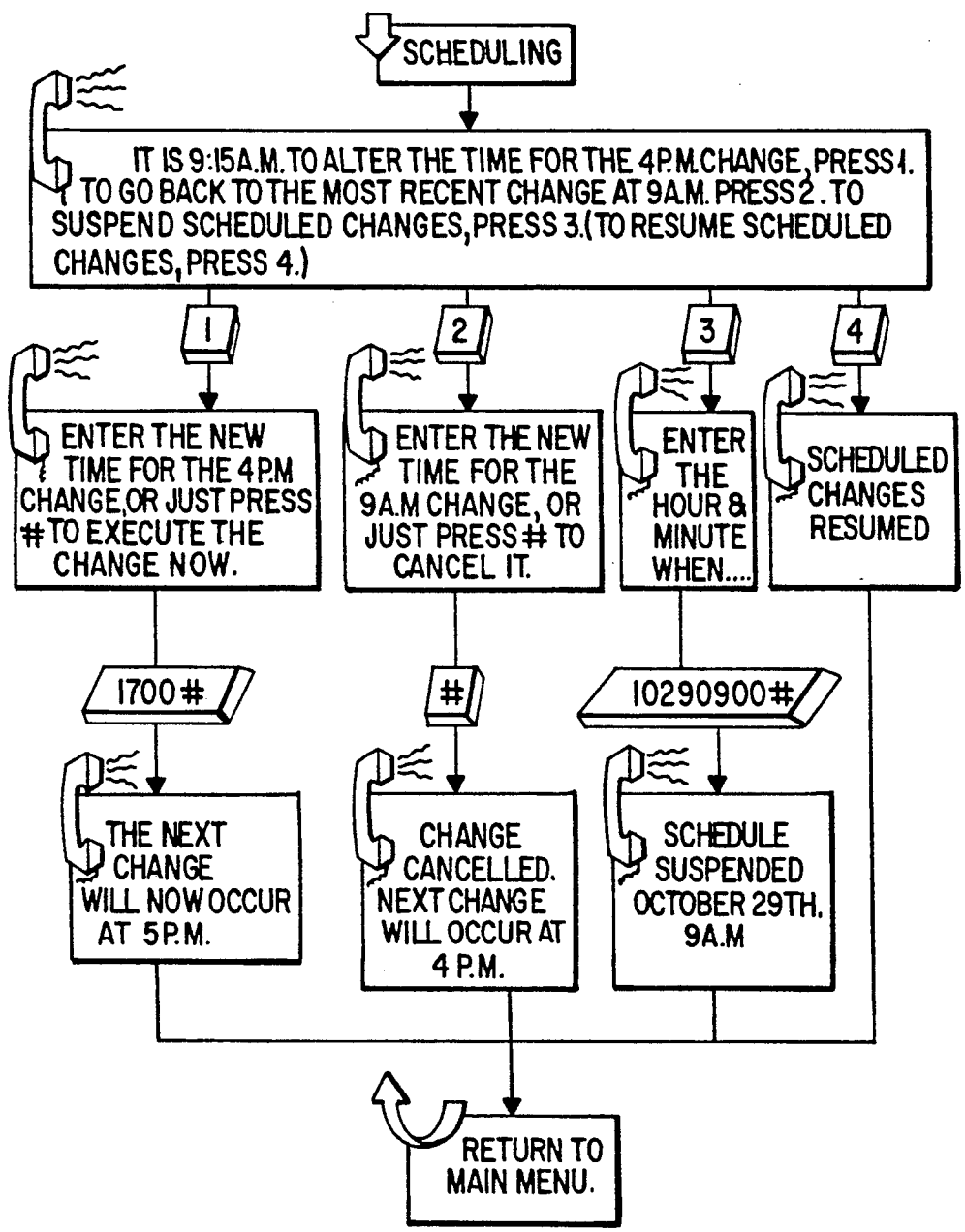
FIG. 3c is a general subscriber service interface flowchart showing how to modify the subscriber schedule.
Figure 3D:
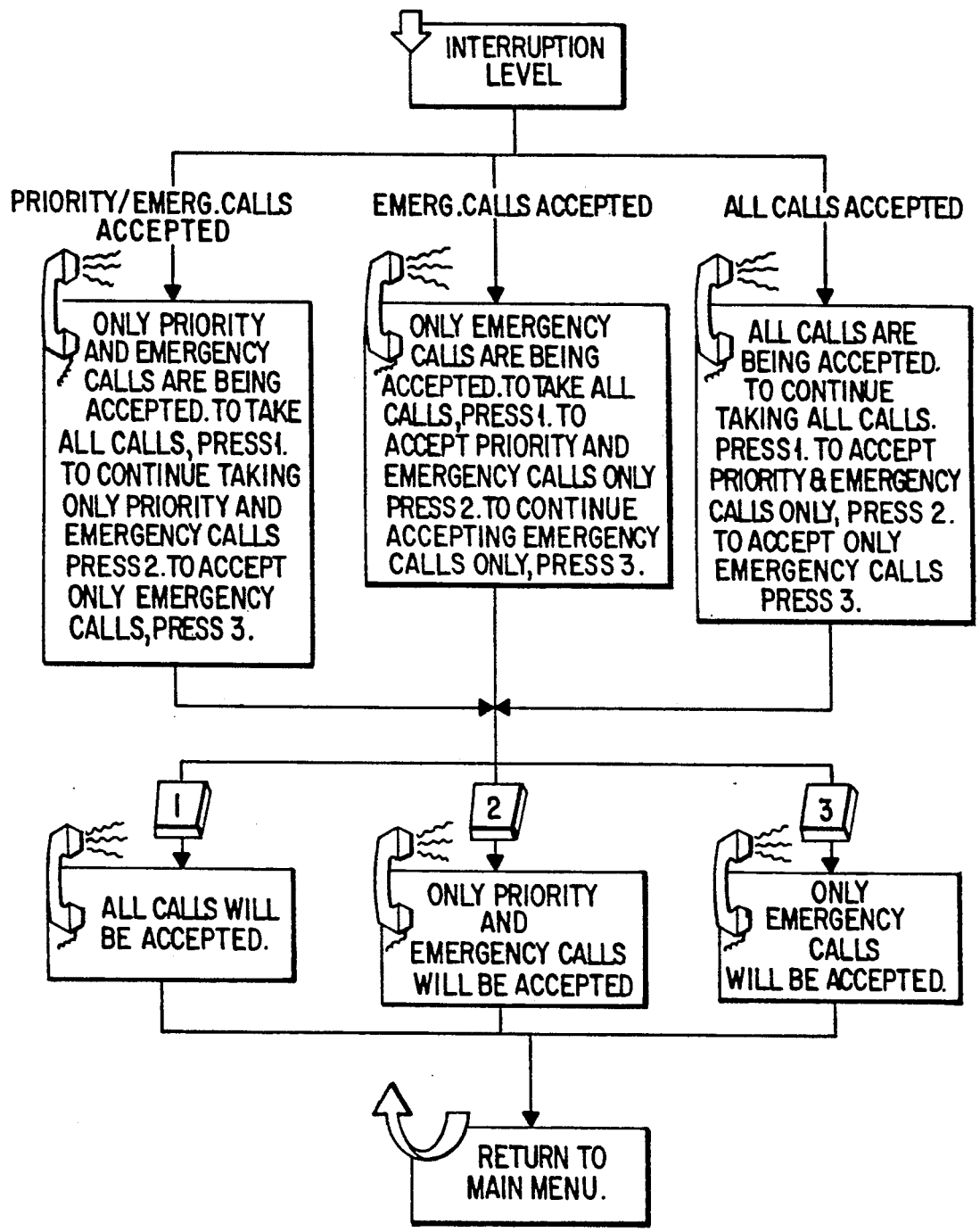
FIG. 3d is a general subscriber service interface flowchart showing how to set the interruption level for incoming calls.
Figure 3E:
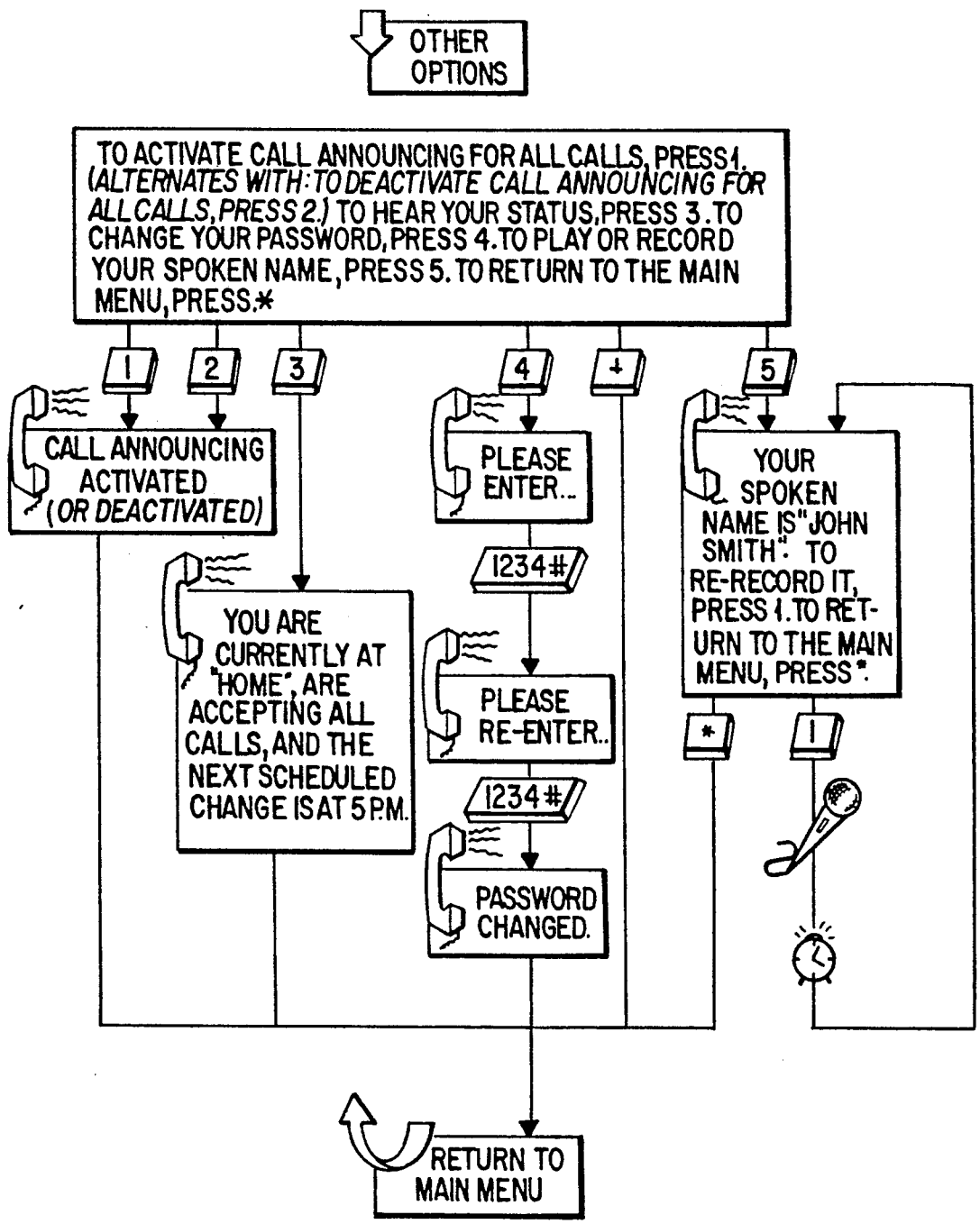
FIG. 3e is a general subscriber service interface flowchart showing how to access other options of the service.

FIGS. 3b to 3e show a number of possible parameters that the subscriber can change from his or her profile. In FIG. 3b, the location where the subscriber can be reached is changed. In FIG. 3c, the subscriber scheduling is temporarily changed. In FIG. 3d, the Interruption Level is changed, and in FIG. 3e, other options are provided to the subscriber, such as, call announcing, status change, change of password, etc. As is shown, all of these are done using Interactive Voice Response technology. The subscriber is lead through all options by simply pressing the correct digits on his or her keypad.

Figure 4:
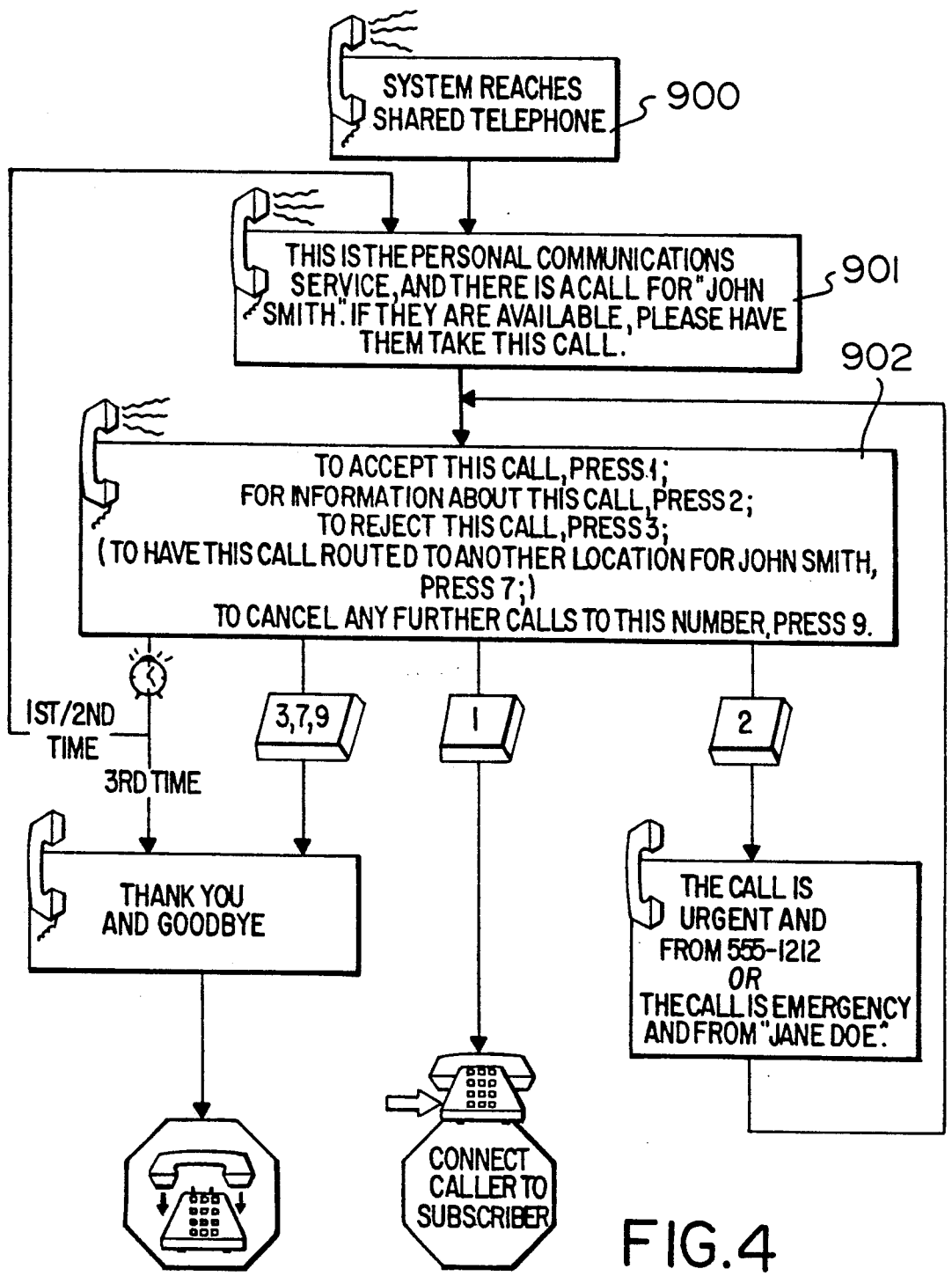
FIG. 4 is a general interface flowchart for providing shared phone call announcement.

FIG. 4 shows the flow of information for the Shared Phone Call Announcement Interface. When the system attempts to reach a subscriber at a telephone that has been indicated as "Shared", the system will announce that there is a call for the subscriber, using the spoken name of the subscriber, as recorded by the subscriber on the voice recording/playback unit 44. The call can be rejected because the subscriber is not there, or it can be accepted by the subscriber, or information about the call can be requested (e.g. CLID and urgency), and the call can then be accepted or rejected. The caller will not know if his call is being announced. He will receive the usual message indicating that an attempt is being made to contact the subscriber, and will either reach the subscriber (the call was accepted), continue to the next hunt location, or have the call completed elsewhere (e.g. the messaging service). This is shown in blocks 900-902 of FIG. 4.

Figure 5:
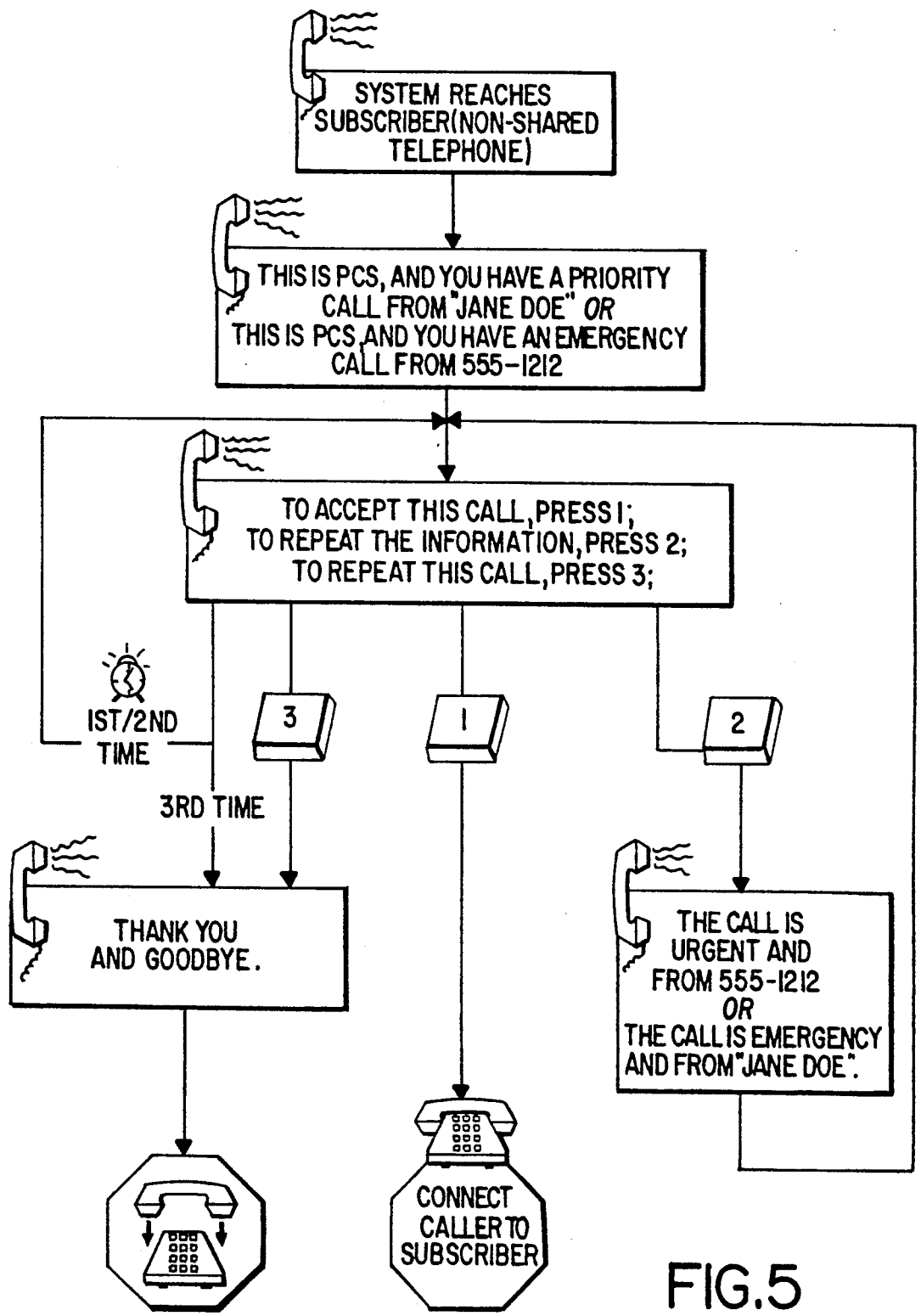
FIG. 5 is a general interface flowchart of the caller identification announcement service.

In addition to the subscriber-verification provided by the Shared Phone Call Announcing, the system will allow for calls to be announced even when the subscriber is the only user of a telephone. This service is shown in FIG. 5. The subscriber is given a number of options on how to answer the incoming call.

What is claimed is:

1. A communication system for routing a call to a subscriber of a telephone mobility management service, wherein the subscriber of the service is assigned a unique personal telephone number, such that an incoming call made to the subscriber's unique telephone number is routed to the subscriber according to a call routing schedule tailored by the subscriber, comprising:
    a) database means for storing:
        i) a list of network addresses associated with telephone devices for use by the service subscriber;
        ii) a list of calling line identification numbers (CLIDs) of callers identified by the subscriber as requiring special routing treatment; and
        iii) a subscriber schedule indicative of which one of said telephone devices an incoming call should be routed to, on the time and day the incoming call is received;
    b) signalling receiver means for detecting the CLID of a caller when a call is received at said subscriber's unique telephone number;
    c) data processing means for receiving the detected CLID and for accessing said list of CLIDs of callers, said list of network addresses and said subscriber schedule stored in said database means; and
    d) application server means for routing the call according to the special routing treatment associated with the caller's CLID and subscriber schedule and wherein said subscriber can access said database means via said application server means and said data processor means to modify each list stored therein.

2. A communication system as defined in claim 1, wherein a call is routed by said application server means to a second telephone device provided in the subscriber schedule, if the subscriber cannot be reached at a first selected telephone device.

3. A communication system as defined in claim 2, wherein said list of network addresses associated with telephone devices for use by the service subscriber further provides the number of times a telephone device is to ring before said call is routed to said second telephone device.

4. A communication system as defined in claim 1, wherein the special routing treatment is stored with said list of CLIDs.

5. A communication system as defined in claim 4, wherein the special routing treatment is provided to incoming calls according to the area code contained with the CLID.

6. A method of routing a call to a subscriber of a telephone mobility management service, wherein the subscriber of the service is assigned a unique personal telephone number, such that an incoming call made to the subscriber's unique telephone number is routed to the subscriber according to a call routing schedule tailored by the subscriber, comprising the steps of:
a) storing in database means:
  i) a list of network addresses associated with telephone devices for use by the service subscriber;
  ii) a list of Calling Line Identification numbers (CLIDs) of callers identified by the subscriber as requiring special routing treatment; and
  iii) a subscriber schedule indicative of which one of said telephone devices an incoming call should be routed to, on the time and day the incoming call is received;
b) accessing, when an incoming call is received, said list of CLIDs to determine whether the incoming call requires a special routing treatment;
c) routing the incoming call, according to said special routing treatment and said subscriber schedule if a CLID is detected and contained on said list of CLIDs; and
d) if a CLID is not detected, routing the incoming call according to said special routing treatment in response to predetermined DTMF tones.

7. A method as defined in claim 6, wherein the special routing treatment is provided to incoming calls according to the area code contained with the CLID.

8. A method as defined in claim 6, wherein the incoming call is routed to a second telephone device provided in the subscriber schedule if the subscriber cannot be reached at a first telephone device.

9. A method as defined in claim 8, wherein said list of network addresses associated with telephone devices for use by the service subscriber further provides the number of times a telephone device is to ring before said call is routed to said second telephone device.

10. A method as defined in claim 6, wherein if an incoming call is routed to a telephone device which is shared between said service subscriber and another answering party, a prerecorded message will be sent to said shared telephone device such that the answering party is informed that the incoming call is directed to the service subscriber.

11. A method as defined in claim 10, wherein the subscriber can acknowledge his presence upon answering the incoming call on the shared telephone device, by dialling a predetermined DTMF code.

* * * * *